(12) United States Patent
Loebig

(10) Patent No.: US 7,272,154 B2
(45) Date of Patent: Sep. 18, 2007

(54) METHOD FOR LINKING UNITS WITH STANDARDIZED INTERFACES TO DEVICES OF A NETWORK SYSTEM

(75) Inventor: Norbert Loebig, Darmstadt (DE)

(73) Assignee: Siemens Aktiengesellschaft, Munich (DE)

( * ) Notice: Subject to any disclaimer, the term of this patent is extended or adjusted under 35 U.S.C. 154(b) by 1048 days.

(21) Appl. No.: 10/182,117

(22) PCT Filed: Jan. 24, 2001

(86) PCT No.: PCT/DE01/00274
§ 371 (c)(1),
(2), (4) Date: Nov. 25, 2002

(87) PCT Pub. No.: WO01/56303
PCT Pub. Date: Aug. 2, 2001

(65) Prior Publication Data
US 2005/0117563 A1 Jun. 2, 2005

(30) Foreign Application Priority Data
Jan. 26, 2000 (DE) .............................. 100 03 272

(51) Int. Cl.
H04J 3/22 (2006.01)
(52) U.S. Cl. .................................................. 370/468
(58) Field of Classification Search ................ 370/468, 370/229, 434, 217, 389, 412, 388, 420, 240, 370/218
See application file for complete search history.

(56) References Cited

U.S. PATENT DOCUMENTS

| | | | | |
|---|---|---|---|---|
| 4,433,411 A | * | 2/1984 | Gefroerer et al. | 370/388 |
| 5,130,974 A | * | 7/1992 | Kawamura et al. | 370/217 |
| 5,287,535 A | * | 2/1994 | Sakagawa et al. | 370/389 |
| 5,463,620 A | * | 10/1995 | Sriram | 370/412 |
| 5,867,494 A | * | 2/1999 | Krishnaswamy et al. | 370/352 |
| 6,002,689 A | | 12/1999 | Christie et al. | 370/401 |
| 6,014,437 A | | 1/2000 | Acker et al. | 370/219 |
| 6,122,292 A | * | 9/2000 | Watanabe et al. | 370/468 |
| 6,392,995 B1 | * | 5/2002 | Quinquis et al. | 370/235 |

FOREIGN PATENT DOCUMENTS

EP  0966145 A2  12/1999

\* cited by examiner

Primary Examiner—Wing Fu Chan
Assistant Examiner—Lawrence J Burrowes
(74) Attorney, Agent, or Firm—Bell, Boyd & Lloyd

(57) ABSTRACT

Commercially available platforms with performance characteristics are linked with network systems via standardized interfaces. Such a link, however, requires major interventions in the structure of said system. The inventive method reduces the necessary steps by means of a message-based concentration on the network bandwidth or a multiple thereof and a line-based concentration on the bandwidth of one of the peripherals during communication, thereby scheduling at least one interface of the allocated control device.

13 Claims, 4 Drawing Sheets

METHOD FOR LINKING UNITS WITH STANDARDIZED INTERFACES TO DEVICES OF A NETWORK SYSTEM

CLAIM FOR PRIORITY

This is the national stage of PCT/DE01/00274 filed on 24 Jan. 2001 which is based on German application 10003272.9 filed on 26 Jan. 2000.

TECHNICAL FIELD OF THE INVENTION

The invention relates to a method of linking units with interfaces to devices of a network system.

BACKGROUND OF THE INVENTION

A switching node usually comprises peripheral devices PE (connection equipment for subscribers or lines), a central computer platform CP, a message distribution device MB and further central units (switching matrix SN, protocol terminating equipment CCNC (e.g. #7), backing storage MD, operating equipment NC). A corresponding configuration is illustrated in FIG. 1.

The peripheral devices perform essential switching tasks, usually in connection with the voice channels of the peripheral device. They therefore contain switching, operation and administrative programs, as well as equipment data information relating to line location, signaling, authorizations, call numbers, individual characteristics of trunk lines and subscriber lines, and also data information relating to the capacity level and the configuration of the peripheral device. The central computer platform serves for the coordinated control of connection establishment and cleardown, as well as for the responses to administrative and error-related configuration changes.

The peripheral devices are connected to one another and to the common central computer platform by means of the message distribution system. The further central system components make special functions available to the network system, e.g. for switching through the voice channels, processing the signaling protocols, realizing the operator interface, or for storing bulk data.

For fail-safety reasons, the central components of a network system are of redundant design (e.g. duplicated). Either it is not possible to design the peripheral devices to be redundant or, in the case of more stringent failure requirements (e.g. saving stable connections beyond the failure of a peripheral device), they may have redundancy.

If signaling data and voice data are routed in a disassociated fashion on separate paths, and if the peripheral devices have then only the task of protocol processing and/or conversion without physical termination of the voice channels, then the restrictions on the peripheral devices with respect to the resource pool and number of voice channels that can be terminated are removed. For this application the capacity of the peripheral device is determined by the performance of the processors, the size of the memory and the capacity of the message interface.

Since more than one direction must be provided for switching the voice through between a calling subscriber and any called subscriber, depending on the origin and destination, therefore, two different peripheral devices PE from the set of all peripheral devices are involved in a given connection establishment and cleardown. FIG. 2 shows such a case in its most general form.

The classical peripheral device terminates exactly the trunk lines for whose call processing it is responsible. There are usually peripheral devices for terminating n PCM30 links (e.g. n=4 for 120 trunk lines). If the voice is now routed outside the peripheral device, the limit to the physically predetermined maximum number of trunk lines that can be terminated becomes inapplicable. For this application, a peripheral device can if necessary process more than 120 connections simultaneously. This is the case for instance for IP-based Internet subscribers whose telephony service is handled by means of Voice over IP (VoIP) under the control of the switching center. Further possible examples are circuit-switched connections that need to be converted by means of a media gateway (MG) into packet-oriented connections under the control of switching centers functioning as media gateway controllers (MGC), or packet-based (e.g. IP-based) connections between two switching centers functioning as media gateway controllers (MGC).

Support of the basic call (call without features) is necessary in all the above-mentioned cases. For this purpose, the inter-exchange signaling (e.g. #7 protocol) or subscriber signaling (e.g. EDSS1) generated or expected by the peripheral devices must be converted to the standards (e.g. H.323) defined for IP-based connections before being forwarded to packet-based subscribers or remote MGCs. If necessary, a media gateway located in the connection path of the payload data must be additionally set. This is likewise packet-based (e.g. IP-based) and is performed by means of suitable protocols (e.g. MGCP, Megaco/H.248) by the media gateway controller.

The new tasks of controlling a media gateway and conversion to the world of Internet-adapted protocols are preferably allotted to new, partially centralized units of the switching center. Such partially centralized units are multifunctional computer platforms with commercially available hardware and operating system-oriented software, and with standardized interfaces (preferably Ethernet with TCP/UDP and IP, but also E1/T1 on the basis of PCM/SDH technology with HDLC/LAPD). Besides the aforesaid tasks, said computer platforms can handle a multiplicity of new tasks emerging from the evolution of the switching center into a call feature server. (For example Internet supplementary services such as click-to-dial (CtD)). The aforesaid commercial platforms are therefore the interfaces of the network system functioning as call feature server in the direction of the packet network/Internet (packet/IP-based subscribers, MGCs, MGs, gatekeepers, AAA servers etc.) and make available packet network/Internet-relevant functions of the network system.

The following technical problem therefore arises with respect to the integration of the aforesaid commercial platforms:

A multiplicity of requirements must be taken into account when integrating a platform in a network system by means of standardized interfaces using LAN, PCM and SDH technology:

For instance the multiplicity of peripheral devices of a switching center should have as direct communications access to the platform to be integrated as all central equipment of the switching center. This means that no message transfer should be performed via units outside the message distribution system. Likewise, the performance of the link should be adaptable at any time to the respective requirements of the applications (scalability), and the physical interfaces of the commercial platform should be economic in use in terms of a few, well-utilized physical interfaces. At the same time, it must be possible to link alien applications on separate physical paths (independence of applications with different requirements for message length and delay), to connect a plurality of commercial platforms at the same time (boost performance and support different interface configurations of the commercial platform), to trigger an alarm on failures of the link at any time (preserve reliability and the maintenance quality of a switching center), and part failures of the link must not lead to the loss of function (redundancy).

According to the prior art, a similar linking problem between a switching center and a service platform is solved within the framework of intelligent network (IN) concepts. In the latter the HW platform of the service control point (SCP) can be viewed as a platform to be linked to a switching center.

SCPs make intelligent network (IN) functionality available across switching centers which can be used in a high performance manner, in extreme cases even per basic call (e.g. call number conversion). SCPs are integrated in the usually #7-based, signaling network of conventional circuit-switched networks. They are consequently linked to the switching centers via standardized interfaces, and moreover satisfy the high availability requirements expected from conventional network systems.

In comparison with the technical problem to be solved in the present case, the insurmountable difficulties set out below arise. The SCP concept is therefore an unsuitable basis for the extension of conventional switching centers in the direction of packet-oriented switching functions.

For instance SCPs have only limited proprietary/manufacturer-specific capabilities for communicating with the equipment of the switching center since they are based on a fully defined standardized protocol (INAP/#7) without sufficient capacity to meet the needs of communication with sub-devices of a network system. Furthermore, they are superordinate units that do not just support a single switching center and are not therefore realized on an open commercial platform on which the switching sub-functions of a switching center can be freely implemented. In addition, SCPs support services, but not complex control operations of the network, such as control of media gateways (MGs) per control protocol (MGCP, Megagco) for example. SCPs are unable to communicate with the devices of the network system for controlling devices outside the switching center (MG setting). Finally, SCPs offer just as few protocol converter functions and capabilities for communicating with subscribers of the switching center as is required for the platform to be linked in the present case. At present SCPs are linked on the basis of time division multiplexing, but not via Ethernet.

SUMMARY OF THE INVENTION

The invention discloses a method of integrating a computer platform in a network system by means of standardized interfaces without incurring major hardware outlay.

An advantage of the invention is that during communication there is a message-based concentration on the network bandwidth or a multiple thereof and a line-based concentration on the bandwidth of one of the peripheral devices which terminates at least one interface of the allocated control device. In this case the latter is to be viewed as a platform. The message-based concentration is performed via an internal message distribution system of the switching center on a plurality of the peripheral devices with protocol terminating capacity. The line-based concentration is performed via switching through data channels of a plurality of peripheral devices with protocol terminating capacity on at least one peripheral device having a physical interface to the control device.

BRIEF DESCRIPTION OF THE DRAWINGS

The invention is explained in greater detail below with reference to an exemplary embodiment illustrated in the figures, in which.

DETAILED DESCRIPTION OF THE PREFERRED EMBODIMENTS

Figure 1:
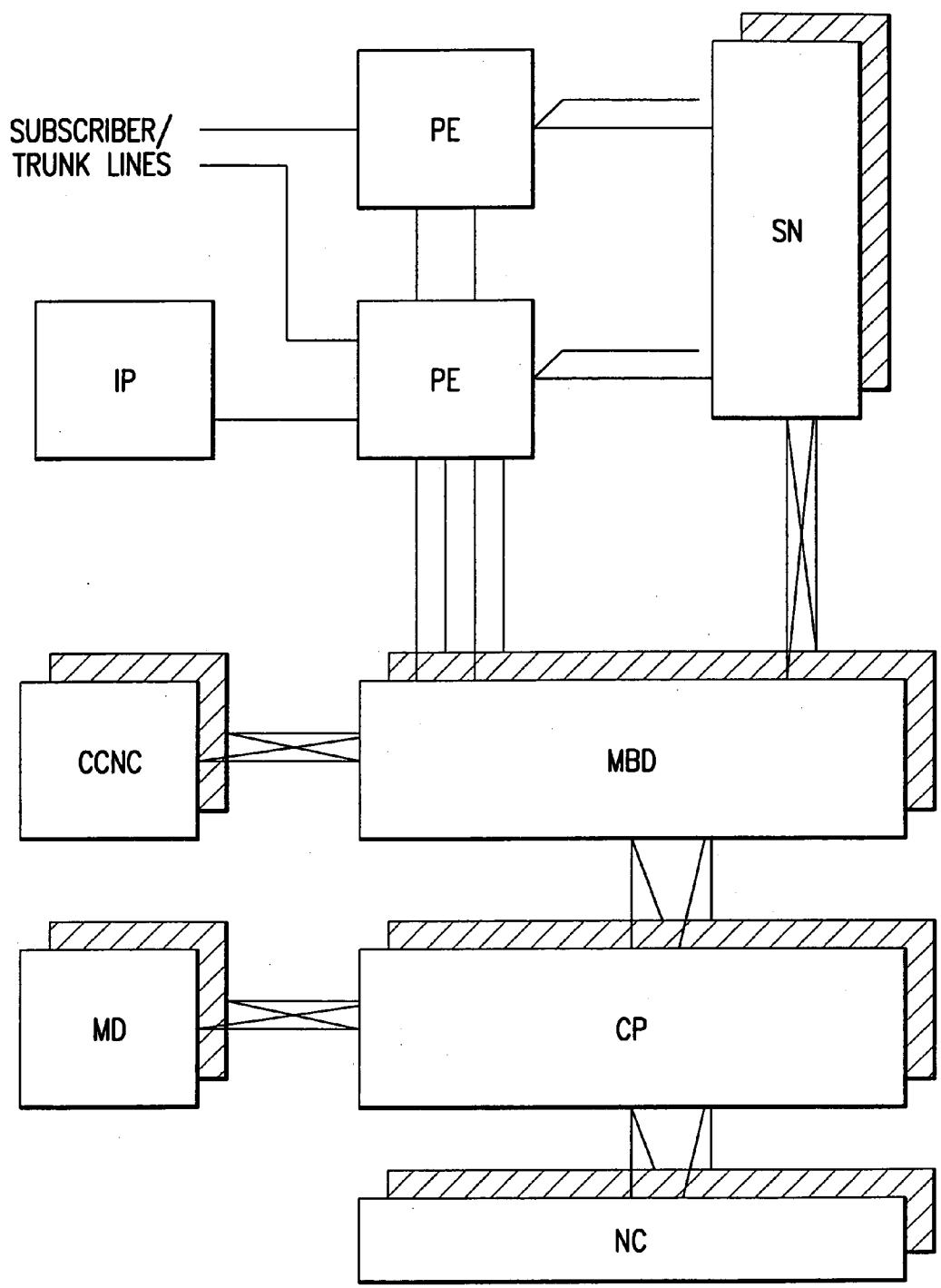
FIG. 1 shows the typical configuration of a network system.
Figure 2:
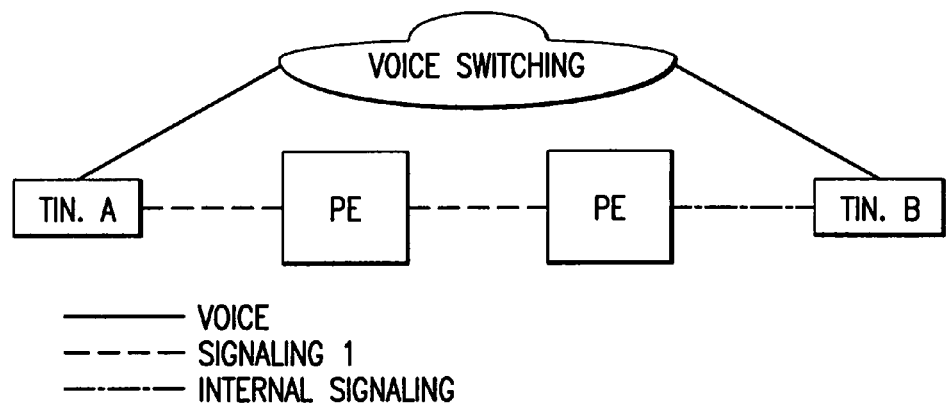
FIG. 2 shows the different routing of voice and signaling

Illustrated in FIGS. 3 to 6 are a total of 4 exemplary embodiments in which it is illustrated how communication takes place between a platform COPL executing switching functions as information source/sink and further devices of a network system.

Common to four exemplary embodiments is the fact that the administrative allocation of at least one peripheral device with protocol terminating functionality (peripheral device with HDLC/LAPD functionality, PE-PRH for short) is performed for every device of a network system involved in the communication with the platform COPL as information source. In particular peripheral devices PE and the coordination processor platform CP of the network system are possible communication partners of the platform. The peripheral devices PE-PRH allocated to the information sources describe the at least one communication path to be used in the direction of the platform COPL. The administrative allocation can be implemented statically as a fixed allocation, but it can equally serve as the default allocation for the system startup which can be dynamically changed automatically by the system depending on availability of the communication access to the platform COPL and depending on the load of the communication paths of the COPL link. With a fully dynamic allocation, the administrative allocation may also be dispensed with entirely.

The communication between peripheral devices and coordination processor CP on the one hand and the computer platform COPL on the other hand takes place via the internal message distribution system MBD of the switching center by means of at least one of the peripheral device with protocol termination PE-PRH allocated to an information source. A first protocol conversion to a standardized protected message transmission method (e.g. HDLC, LAPD) is performed there. The resulting messages are forwarded in a bearer channel of the network system having the bandwidth nx64 kbit/s in the direction of the main switching matrix SN. Conversely, the messages generated by the platform COPL are supplied to the peripheral device with protocol termination over the main switching matrix SN in such a bearer channel and are converted to the message format of the internal message distribution system MBD of the switching center, and are forwarded in the direction of the destination address, that is to say the peripheral or central device of the network system addressed by the application on the platform COPL.

The above-described bearer channels of different peripheral devices with protocol termination are switched through as a fixed connection (nailed-up connection NUC) to peripheral devices with terminating function PE-TERM. This results in a line concentration on a few physical interfaces (e.g. Ethernet with TCP/IP) to the platform COPL. The aforesaid fixed connections NUC are switched already before the switching release during network system run-up, which enables a possible increased call failure rate during the system run-up to be avoided owing to the as yet unavailable communication with the platform COPL.

The conversion to the protocol (e.g. TCP/IP) supported on the COPL side is performed in the peripheral device with terminating function PE-TERM. For this the messages supplied on the plurality of bearer channels (e.g. 120×64 kbit/s with LAPD) are picked up by the voice channel interface of the terminating function PE-TERM for output to the platform COPL and converted to the protocol to be used in the direction of the platform COPL, if this should be necessary. The user data treated in this way are then output via the physical interface toward the platform COPL. Given a basic switching granularity of a peripheral device of 120×64 kbit/s it is therefore possible to attain a net payload data rate of 6-7 Mbit/s (load 0.8 Erl per bearer channel) on a physical interface to the COPL (e.g. 1×Ethernet 100BaseT or 4×E1). An expansion module of the peripheral device PE-TERM can preferably be used to provide the physical interface and for protocol conversion.

The devices PE-PRH and PE-TERM can be used exclusively for the described functionality. They can, however, also provide further switching functions for the network system in the context of the limits of its resources. In particular, they can coincide with peripheral devices whose hardware serves to provide virtual peripheral devices. The functionality of said virtual peripheral devices is described in detail in European Patent Application EP 99123208.3.

Figure 3:
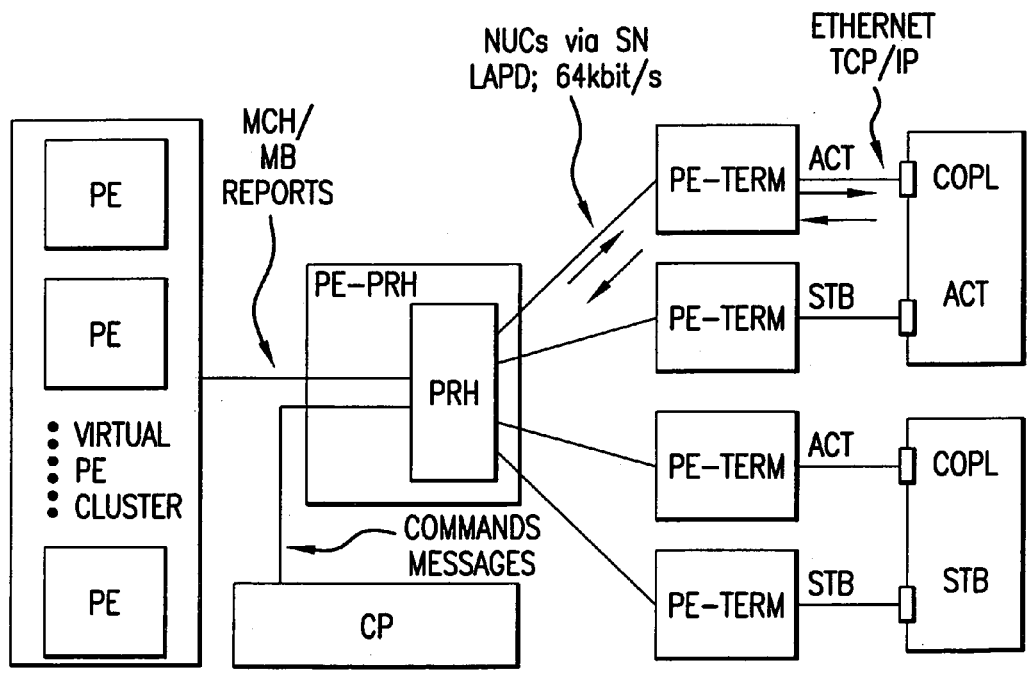
FIG. 3 shows the communication PE/CP<-> COPL in a cluster configuration.
Figure 4:
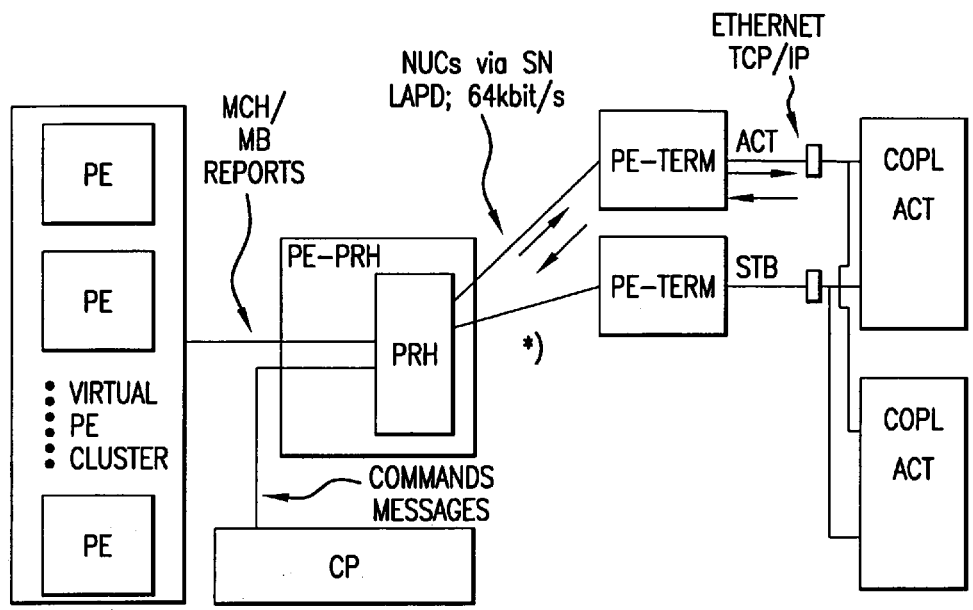
FIG. 4 shows the communication PE/CP<-> COPL in microsynchronous.
Figure 6:
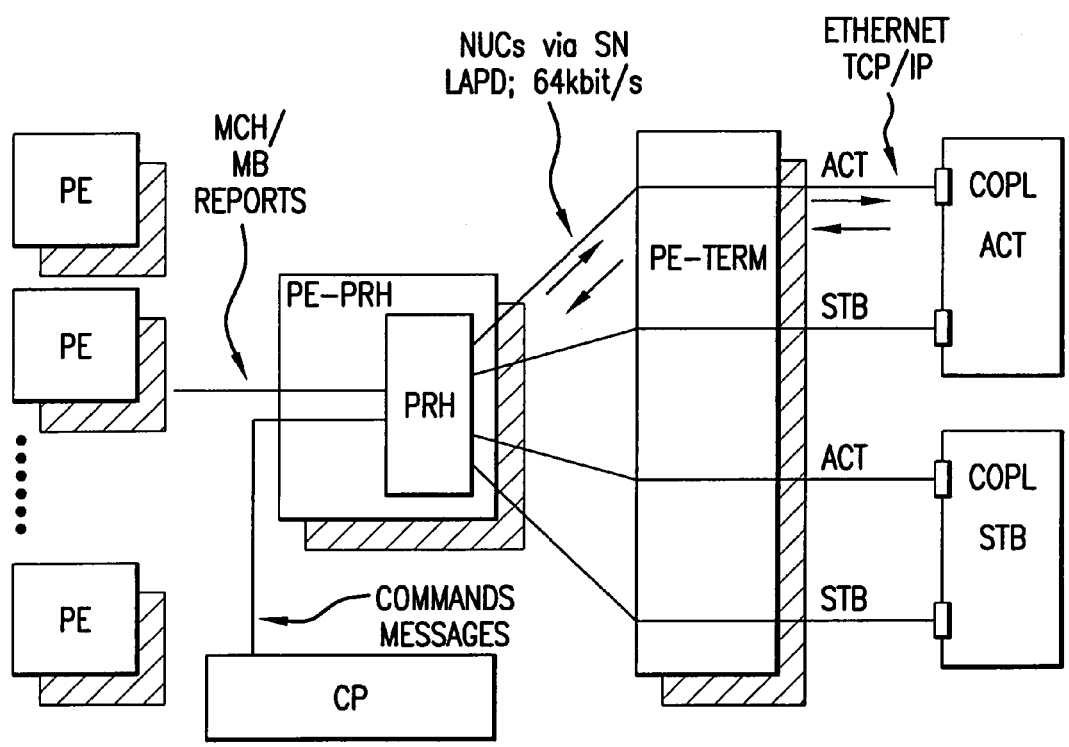
FIG. 6 shows the communication PE/CP<-> COPL in a cluster configuration via a duplicated PE.

For fail-safety reasons, the peripheral devices PE-PRH, PE-TERM can be designed as duplicated peripheral device, as is shown by way of example in FIG. 6. Likewise the physical interface between the peripheral device PE-TERM and the platform COPL is usually designed to be at least duplicated. Finally, the platform COPL itself is designed with internal redundancy as a device of a switching center with partially centralized functions. At the present time platforms COPL with microsynchronous parallel operation (1 duplicated interface) and platforms with a cluster configuration (at least 2 duplicated interfaces) are customary, as are illustrated in FIGS. 3 and 4.

If the peripheral devices PE-PRH and PER-TERM are designed as non-duplicated peripheral devices, an n:1 redundancy of the peripheral device PE-PRH can be provided in the sense of the redundancy of virtual peripheral devices.

Limitations in the linking of the platform COPL as a result of the failure of a non-duplicated peripheral device PE-TERM can be avoided by duplicated routing of the bearer channels of the peripheral device PE-PRH via 2 fixed connection channels NUC and 2 different peripheral devices PE-TERM to the duplicated physical interface to the platform COPL. (Compare FIGS. 3-6.)

A duplicated physical interface to the platform COPL can be operated as an entity or if necessary channel-oriented in active (ACT) /stand-by (STB) or ACT/ACT in load-sharing or broadcast mode. In order to keep the configuration of the interface simple from the point of view of the network system, the devices PE-PRH and PE-TERM adapt to every operating mode wished by the COPL side. They receive corresponding setting commands for this purpose from the platform COPL. The operating mode can be changed at the COPL side during operation. To monitor the availability of the communication paths to the platform COPL, the layer 1 (e.g. PCM link, Ethernet), the layer 2 (e.g. HDLC), and the layer 3 are monitored in the units PE-PRH and PE-TERM respectively. In particular, the availability of the platform COPL is monitored by cyclically repeated layer 3 test commands to be answered by the platform COPL.

In order that the applications on the peripheral and central devices of the network system remain independent of the characteristics of the message transport to and from the platform COPL, appropriate call interfaces (APIs) are made available to the applications. The APIs are part of SW subsystems (transfer-user) that govern the type of transport of the messages between the devices of the network system and the platform COPL. If a plurality of physical paths are available for a communication, then the transfer-user subsystems are responsible for selecting a suitable path in the direction of the platform COPL, taking the aspects of availability, the appropriate load distribution or an allocated predefined default path into account.

The transfer-user peripheral devices are in communication with a superordinate transfer-user (central load distributor) on the coordinating processor platform CP of the network system. The central load distributor receives and coordinates the failure/renewed availability messages of the devices PE-PRH and PE-TERM as well as the general error analysis and configuration subsystems of the network system, ensuring thereby that an error message relating to the linking of the platform COPL is reported if it is the cause of the underlying problem (e.g. in the case of the PCM failure, a multiplicity of concomitant HDLC layer 2 failures are not reported).

The central load distributor furthermore issues alerts on availability restrictions or loss of communication with the platform COPL. In particular with failures of individual devices PE-PRH, in the case of fixed allocation of a peripheral or central device to the affected communication path to be used, it ensures the renewed availability of the functions provided in the allocated devices which interact with the platform COPL by allocating a device PE-PRH in operation according to load distribution aspects. With the renewed availability of temporarily failed parts of the devices PE-PRH or PE-TERM associated with linking the platform COPL, the communication paths that are consequently available again are automatically brought back into use; if necessary a changed allocation of the peripheral and central devices to the communication paths to the platform COPL is performed.

FIG. 3 shows the communication of a plurality of virtual peripheral devices PE with the platform COPL.

This is of redundant design in a cluster configuration, with one COPL half having an active operating state ACT and the other half having an inactive operating state STB (STAND-BY). The signaling messages emanating from the virtual peripheral devices PE are terminated in the peripheral devices PE-TERM in the case of LAPD on the basis of 64 kbit/s and converted to TCP/IP on the basis of Ethernet and supplied to the platform COPL.

FIG. 4 shows the communication of the virtual peripheral devices PE with the platform COPL in a micro-synchronous (parallel) operating mode. In this case the connections are transposed behind the peripheral devices PE-TERM, but the two halves of the platform COPL have an active operating state ACT in each case.

Figure 5:
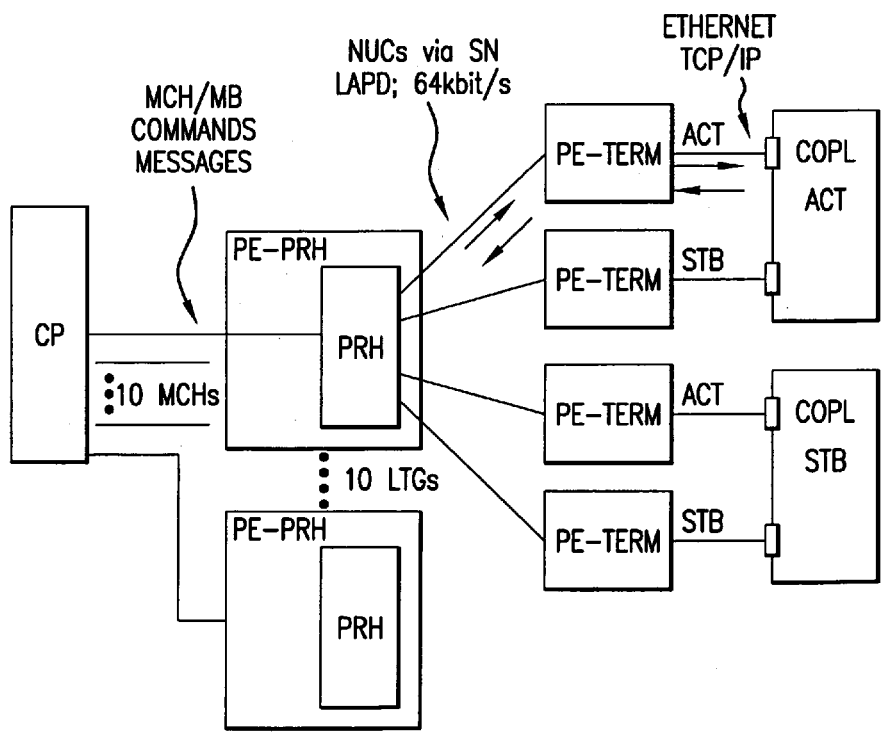
FIG. 5 shows the communication CP<-> COPL in a cluster configuration over a plurality of paths.

FIG. 5 shows the communication of the central computer platform CP with the platform COPL. The latter is again of redundant design in a cluster configuration, with one half having an active operating state ACT and the other half having an inactive operating state STB (STAND-BY).

Finally, FIG. 6 shows the communication of peripheral devices PE with the platform COPL, with the former being of duplicated design. The latter is of redundant design in a cluster configuration, with one half having an active operating state ACT and the other half having an inactive operating state STB (STAND-BY).

The invention claimed is:

1. A method for communication between devices of a network system and control devices allocated thereto, comprising:

during communication, terminating at least one interface of the allocated control devices as a result of a message-based concentration on a network bandwidth and a line-based concentration on a bandwidth of at least one peripheral device, wherein
a data channel is switched through a system-internal nailed-up connection during system run-up prior to the release of switching.

2. The method as claimed in claim 1, wherein the control devices allocated to the network system are linked to the network system by means of standardized interfaces including one of an Ethernet, ATM, PCM or SDH interface.

3. The method as claimed in claim 2, wherein physical characteristics of the link remain concealed from applications running in the devices of the network system and in the control device through introduction of a specific transport layer with invariant application interface.

4. The method as claimed in claim 1, wherein the message-based concentration is performed via an internal message distribution system of a switching center on a plurality of the peripheral devices with protocol terminating capacity.

5. The method as claimed in claim 1, wherein the line-based concentration is performed via switching through data channels of a plurality of peripheral devices with protocol terminating capacity on at least one peripheral device having a physical interface to the control device.

6. The method as claimed in claim 1, wherein the communication takes places via a fixed allocated peripheral device with protocol terminating capacity or dynamic allocation according to availability or load.

7. The method as claimed in claim 1, wherein a standardized interface to the control device is defined as a PCM interface with 64 kbit/s channels that are protected by means of the HDLC or LAPD protocol.

8. The method as claimed in claim 1, wherein a standardized interface to the control device is defined as an Ethernet interface with TCP/IP protocol.

9. The method as claimed in claim 1, wherein the peripheral devices, the peripheral devices with protocol terminating capacity and the peripheral devices having a physical interface coincide in any combination with respect to the HW.

10. A method for communication between devices of a network system and control devices allocated thereto, comprising:

during communication, terminating at least one interface of the allocated control devices as a result of a message-based concentration on a network bandwidth and a line-based concentration on a bandwidth of at least one peripheral device, wherein
the line-based concentration is performed via switching through data channels of a plurality of peripheral devices with protocol terminating capacity on at least one peripheral device having a physical interface to the control device, and
the peripheral device having the physical interface to the control device are of duplicate design, or a plurality of interfaces of the control device are connected to different, non-redundant peripheral devices having a physical interface.

11. A method for communication between devices of a network system and control devices allocated thereto, comprising:

during communication, terminating at least one interface of the allocated control devices as a result of a message-based concentration on a network bandwidth and a line-based concentration on a bandwidth of at least one peripheral device, wherein the load distribution is performed in a direction of the control device by the network system and in an opposite direction by the control device.

12. A method for communication between devices of a network system and control devices allocated thereto, comprising:

during communication, terminating at least one interface of the allocated control devices as a result of a message-based concentration on a network bandwidth and a line-based concentration on a bandwidth of at least one peripheral device, wherein a plurality of control devices controllable in logically different operating modes are configured to be linked to the same network system with different physical interfaces.

13. A method for communication between devices of a network system and control devices allocated thereto, comprising:

during communication, terminating at least one interface of the allocated control devices as a result of a message-based concentration on a network bandwidth and a line-based concentration on a bandwidth of at least one peripheral device, wherein the peripheral devices with protocol terminating capacity and the peripheral devices having a physical interface generally coincide and the line-based concentration is dispensed.

* * * * *